Figure 1:
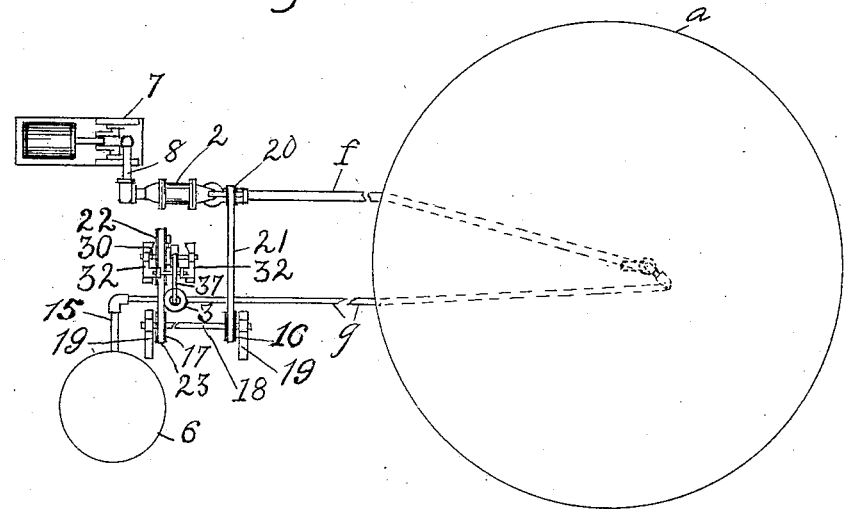

No. 879,111. PATENTED FEB. 11, 1908.
M. MILLER.
AUTOMATICALLY CONTROLLED OR SELF REGULATING PUMPING MECHANISM.
APPLICATION FILED NOV. 12, 1906.

3 SHEETS—SHEET 1.

Witnesses.
Claude F. Smith
Rufus Cope

Inventor:
Marshall Miller
By Harry Irwin Crozier
Att'y

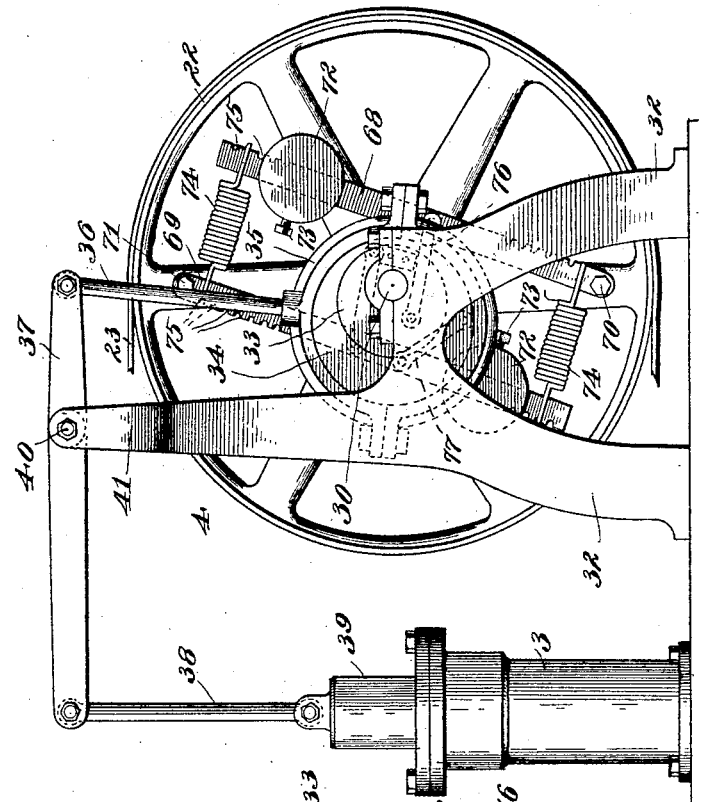

No. 879,111. PATENTED FEB. 11, 1908.
M. MILLER.
AUTOMATICALLY CONTROLLED OR SELF REGULATING PUMPING MECHANISM.
APPLICATION FILED NOV. 12, 1906.

3 SHEETS—SHEET 3.

Witnesses.
Claude F. Smith
Rufus Cope

Inventor.
Marshall Miller
By Harry Irwin Cromer
Att'y.

UNITED STATES PATENT OFFICE.

MARSHALL MILLER, OF ST. LOUIS, MISSOURI.

AUTOMATICALLY-CONTROLLED OR SELF-REGULATING PUMPING MECHANISM.

No. 879,111.      Specification of Letters Patent.      Patented Feb. 11, 1908.

Original application filed July 2, 1906, Serial No. 324,441. Divided and this application filed November 12, 1906. Serial No. 343,045

*To all whom it may concern:*

Be it known that I, MARSHALL MILLER, a citizen of the United States, residing in St. Louis, in the county of St. Louis and State of Missouri, have invented certain new and useful Improvements in Automatically-Controlled or Self-Regulating Pumping Mechanisms, of which the following is a specification.

This invention relates to automatically controlled or self-regulating pumping mechanisms adapted to pump and continuously and automatically control the quantity or volume of a current of liquid.

It relates particularly to pumping mechanism comprising or operated by driving mechanism having a varying speed, or by the force of a current of liquid of varying pressure, velocity or volume, and provided with means for automatically changing and constantly controlling the speed of operation or pumping capacity of the pump proper, with relation to the driving mechanism or motor, and thereby automatically controlling the volume of liquid pumped.

The principal object of the invention is to provide a simple, economical and efficient automatically controlled or self-regulating pumping mechanism, adapted to be used in connection with or form a part of an apparatus for treating storing and delivering water.

A further object is to provide pumping mechanism adapted to be operated by a driving mechanism or motor having a varying speed, with means for automatically controlling or regulating the speed of operation or length of stroke of the pump and thereby regulating or controlling the quantity or volume of liquid pumped.

A further object is to provide, in combination with a motor adapted to be operated by means of a current of liquid or water to be treated, suitable pumping mechanism connected with and driven by such motor and provided with means for automatically controlling or regulating the quantity or volume of liquid pumped by such pumping mechanism with relation to the quantity or volume of the liquid which operates the motor, whereby the liquid passing through the pump and that by means of which the motor is operated may be intermixed in the desired proportions and continuously.

Other and further objects of the invention will appear from an examination of the drawings and the following description and claims.

Reference is made to an application for Letters Patent of the United States Serial No. 324,441, filed in my name on the second day of July, 1906, for an improvement in apparatus for treating, storing and delivering water, of which this is a divisional application, and subject matter herein described but not claimed will be found described and claimed in said application.

This invention consists in the features, combinations and details of construction hereinafter described and claimed.

Figure 2:
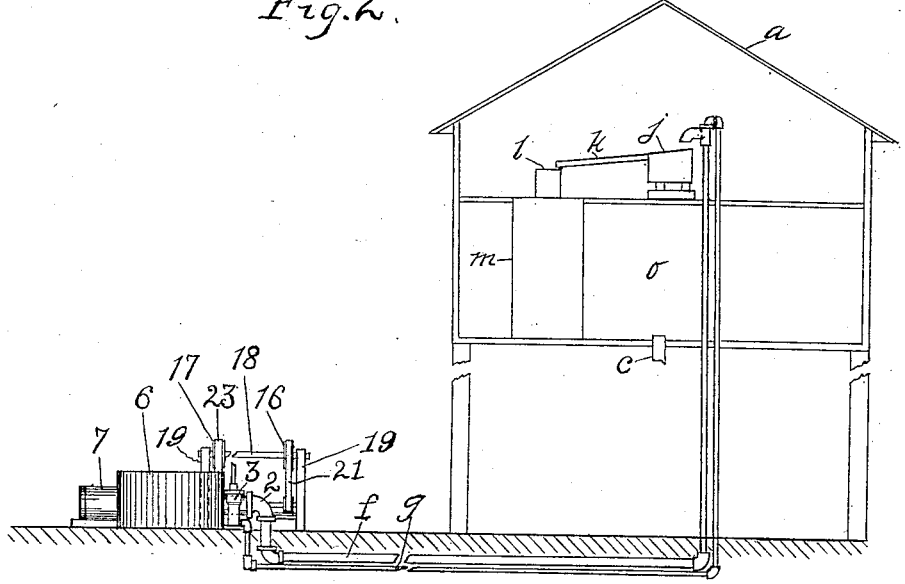
Figure 6:
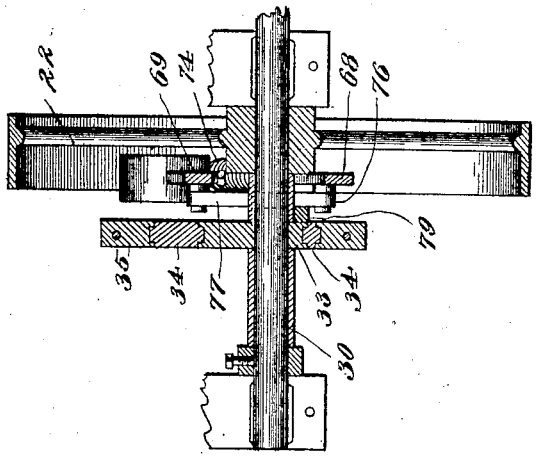
Figure 5:
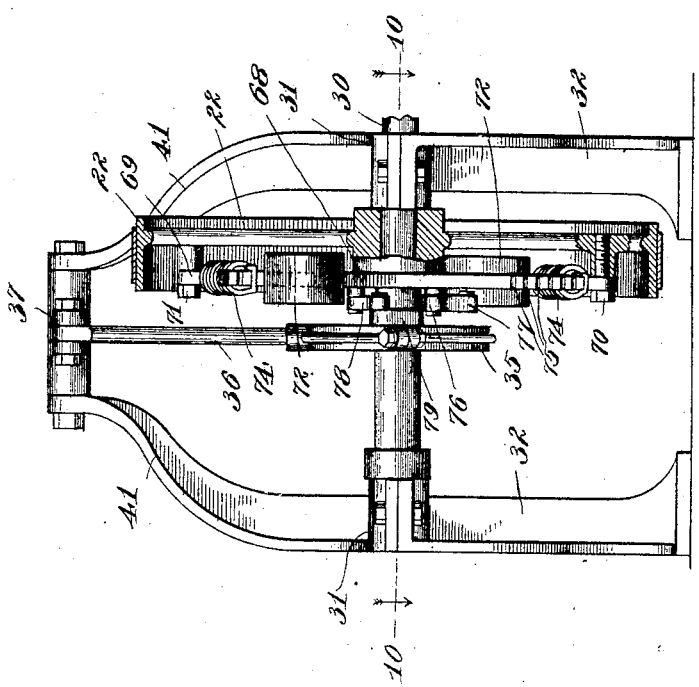

In the accompanying drawings Figure 1 is a diagrammatic plan view of an apparatus constructed in accordance with my improvements as applied to or forming a part of an apparatus for treating water. Fig. 2 a side elevation of the same, Fig. 3, a view in side elevation of an automatically controlled or self regulating pumping mechanism or pump and governor constructed in accordance with my improvements; Fig. 4 a detail view in side elevation of the mechanism shown in Fig. 3, with certain parts omitted or broken away, and showing the position of the governor parts when running at a comparatively high speed; Fig. 5 a view in elevation of the mechanism shown in Fig. 3 looking toward the left of said figure,—a portion of the driving or pulley wheel being in section, and Fig. 6 a horizontal sectional view of the mechanism shown in Fig. 5.

It is very desirable—as already suggested— that this improved automatically controlled or self-regulating pumping mechanism be adapted to be used in connection with and form a part of an improved apparatus for chemically treating, storing and delivering water. It should be adapted to provide means for pumping the chemical solution into the water to be treated, and means whereby the quantity of chemical solution supplied may be regulated so as to remain as nearly as possible uniform in proportion to the quantity of water supplied or to be treated. The water to be treated is ordinarily under varying pressure and the current of such water is not constantly of uniform volume. It is desirable that the mechanism for supplying the chemical solution— the automatically controlled pumping mechanism—should be driven or operated by means of the current of water to be treated, and that the current of chemical solution should vary proportionately, or in other words, correspond with the varying quantity or volume of water to be treated.

In constructing an apparatus in accordance with my improvements and adapted to accomplish the objects of the invention, I provide a motor 2 which is adapted to be operated by a current of water to be treated. Pumping mechanism comprising a pump or piston and cylinder portion 3 and governor mechanism 4 is provided and operatively connected with the motor in such a manner that the pump is driven by the motor. The governor mechanism is so operatively connected with the pump as to control the speed of operation or length of stroke of the pump and thereby the quantity or volume of liquid flow produced by the pump. The governor mechanism is operatively connected with the motor in such a manner that it is operated by the motor and automatically regulates the pump proper by changing its speed or pumping capacity relatively to the motor.

For operatively connecting the pump and governor mechanism with the motor a suitable set of gears or belts and pulleys, which may be of any desired known type, are provided, and may be constructed and arranged as follows: Pulleys 16 and 17 are mounted upon a shaft 18 which is journaled in a supporting frame 19. The pulley 16 is connected with the driving pulley 20 of the motor 2, already described, by means of a belt 21. The pulley 17 is connected with the pump driving pulley or wheel 22—upon which the pump controlling governor mechanism hereinafter described is mounted—by means of a belt 23. The pump driving belt wheel or pulley 22 is mounted upon a shaft 30 which is journaled in suitable bearings 31 in a supporting frame 32, which may be of any desired type. The pulley 22 is operatively connected with the pump piston by means of a pair of eccentrics 33 and 34, an eccentric strap 35 upon the outer eccentric 34, a connecting rod 36, a walking beam or pivoted lever 37, and a piston rod 38, which is connected with the reciprocating piston 39 of the pump proper. The walking beam 37 is pivotally mounted, by means of a pivot pin 40, upon an upwardly extending arm 41 of the supporting frame 32. Said walking beam or lever is pivotally connected at one end with the piston rod 38, and thereby with the piston 39, and at its other end with the pitman or connecting rod 36 and thereby with the eccentric mechanism already described. The inner eccentric 33 already described, is rotatably mounted on the shaft 30, and the outer eccentric 34 is rotatably mounted upon such inner eccentric and encircled by the eccentric strap 35, such eccentric mechanism being operatively connected with the pump piston in the manner already described, and forming a connection between the pump piston and the shaft 30 upon which the eccentric mechanism is mounted, and thereby with the motor which drives the pump.

The eccentric mechanism is connected with the pump driving belt wheel 22 in such a manner that when the wheel is rotated at a comparatively high speed the eccentrics will be automatically adjusted so as to give the pump piston a comparatively short stroke, and when the wheel is rotated at a comparatively low speed the eccentrics will be automatically adjusted so as to give the pump piston a longer stroke. In short the length of stroke of the pump piston is automatically regulated and varied with relation to the speed of rotation of the wheel 22 and with relation to the speed of the motor so as to correspond as nearly as possible with the varying quantity or flow of water passing through the motor and driving it and thereby the pump. The quantity of liquid passing through the pump is thus automatically regulated and kept in the desired proportion with relation to the liquid passing through and driving the motor, and the pump is adapted to cause the liquid passing therethrough to be intermixed with the liquid passing through the motor in the desired proportions and continuously notwithstanding the fact that the speed of the motor and the pressure and quantity or volume of water passing therethrough vary. In order to enable this automatic control or self-regulation of the pumping mechanism to be accomplished in a simple and efficient manner by automatically adjusting the eccentrics and thereby controlling the length of stroke or speed of operation of the pump piston, as above suggested, levers 68 and 69 are pivotally secured to the belt wheel 22 which is in fixed relation to the shaft 30, by means of pivot pins 70 and 71. These levers normally extend in parallel relation to each other on opposite sides of the axial center of the wheel, the swinging end of each lever being adjacent to the pivoted end of the other. The swinging end of each lever is provided with a weight 72 adjustably secured thereon by means of a set screw 73. The swinging end of each lever is also yieldingly connected with the pivoted end of the other by means of a spiral spring 74, each of such spiral springs being connected to both levers by having its opposite ends inserted in notches 75 so that the springs may be adjusted to any desired position longitudinally of the levers. The degree of resistance to the outward movement of the weighted ends of the levers may thus be regulated by the position of the springs. The lever 68 is connected with the relatively small inner eccentric by means of a link 76 which is pivotally secured at one end to the said lever a suitable distance from its pivoted end to afford the required fulcrum, such link being pivotally secured at its other end to the eccentric a sufficient distance from the axial center of the shaft 30 to cause the eccentric to rotate in one direction when the lever 68 is moved outward, and in the opposite direction when it is moved inward toward the axial center of the shaft and center of rotation of the eccentric. The lever 69 is connected by means of similar links 77 and 78 with both eccentrics. The link 77 is pivotally secured at one end to the lever 69, and at its opposite end to the large outer eccentric 34, at the desired distance from the axial center of the shaft 30 on one side of such shaft. The link 78 is pivotally secured at one end to the lever 69, and, at its opposite end, to the small inner eccentric by means of a connecting block 79, the points of pivotal connection of the respective links 77 and 78 with the eccentrics being on opposite sides of the shaft 30. In other words the shaft 30 is intermediate the points of pivotal connection between the respective links 77 and 78 and the eccentrics, so that the outward movement of the lever 69 as when the motor is operating at a relatively high or increasing speed will cause the eccentrics to rotate in opposite directions bringing the geometrical center of the outer eccentric from normal position inward to a point nearer the axial center of the shaft 30, thus reducing the length of stroke of the pitman 36 and the pump piston. It follows that the movement of the lever 69 inward as when the motor is operating at a relatively low or decreasing speed will tend to rotate both eccentrics so as to move the geometrical center of the outer eccentric further away from the axial center of the shaft 30, thereby increasing the length of stroke of the pitman and the piston of the pump, and correspondingly increasing the speed of movement of the piston or the speed of operation of the pump. The extent of the outward and inward movements, or in other words, the relative positions of the weighted levers and of the eccentrics is determined by the speed of the rotation of the belt wheel or pump driving wheel 22 to which such levers are secured,—the outward movements of the levers being produced by the rotation of the wheel and the action of centrifugal force and the inward movements by the action of the springs which tend to yieldingly resist such outward movements and hold the levers and eccentrics in position to produce relatively short strokes of the pump piston. The speed of operation or pumping capacity of the pump is thus changed and controlled with relation to the speed of the motor, and the flow of liquid or volume of the current produced by the pump is automatically controlled and regulated with relation to the volume or quantity of liquid passing through and propelling the motor.

It is desirable that the motor should be one which is adapted to be operated by a current of water forced therethrough to a higher level, and that the pumping mechanism driven by such motor be adapted to force its current to the desired elevation above the level of the motor and pump, to be intermixed with the liquid from the motor. The pressure and volume of the current of liquid which operates the motor often varies considerably. In practice this is frequently if not always unavoidable,—particularly when the source of power and of water supply is an ordinary water system and the water supply pipe consists of an ordinary water main. The speed of the motor should vary so as to correspond closely with the variations in the pressure and volume of water passing therethrough. A form of motor suitable for use in a water treating system will be found described in the application above referred to, of which this is a divisional application, and is is therefore deemed unnecessary to describe the motor in detail herein. The preferred form of motor to be used in connection with the pumping mechanism herein described, and the motor herein referred to is, however, constructed as described and illustrated in the above mentioned application.

The inlet pipe 8 of the motor communicates with the source of power and of water supply, which may be in the form of a pump 7 of any desired type adapted to supply the desired quantity of water in the form of a current having sufficient force to drive the motor and the pumping or other mechanism connected with and to be operated by the motor. The inlet pipe 15 of the pump communicates with a chemical supply tank 6 from which the pump should be adapted to pump a chemical solution into the water by which the motor is operated. The outlet pipe $f$ of the motor 2 and the outlet pipe $g$ of the pump 3 both lead upward to a point at an elevation above the level of both the motor and pump, as shown in Fig. 2, into an elevated tank $a$ having a storage chamber $o$ in which is arranged a treating and settling tank or chamber $m$ having an outlet opening at its upper end and an inlet opening formed by a central tube $l$ which extends above and downward into the settling tank. A mixing chamber $f$ and trough $k$ form a conduit leading from the outlet openings of the pipes $f$ and $g$ into the settling tank $m$. The water from the motor and the liquid from the pump are thus raised in regulated proportions to the desired elevation and in position to pass downward by force of gravity through the settling and treating tank, into the storage chamber, and out through the outlet pipe $c$ to the tanks of locomotive engines to be supplied with treated water, all by a single pumping operation. The settling and treating tank is constructed as described and illustrated in the original application above referred to of which this is a division.

I claim:

1. In an apparatus of the class described, the combination of a motor having an outlet pipe provided with a discharge opening above the level of said motor, a pump connected with said motor and adapted to be driven thereby and provided with an outlet pipe leading from said pump to an elevation above the level of the motor, and means for automatically maintaining the pump delivery proportional to the current through the motor.

2. In an apparatus of the class described, the combination of a motor having an outlet pipe provided with a discharge opening above the level of said motor, a pump provided with piston mechanism operatively connected with said motor and adapted to be driven thereby, and means for automatically maintaining the pump delivery proportional to the current through the motor.

3. In an apparatus of the class described, the combination of a motor having an outlet pipe provided with a discharge opening above the level of said motor, a pump provided with piston mechanism operatively connected with the motor and having a discharge pipe provided with a discharge opening above the level of said pump, and means for automatically shortening the pump stroke when the speed increases.

4. In an apparatus of the class described, the combination of a motor, a supply pipe connected with such motor and communicating with a source of water supply, a pump connected with the motor and adapted to be driven thereby, outlet pipes connected with such motor and pump respectively each having a discharge opening above the level of the motor, a supply pipe connected with said pump and communicating with a source of liquid supply, and means for automatically decreasing the speed of delivery of the pump with relation to the speed of the motor, when the speed of the motor increases.

5. In an apparatus of the class described, the combination of a motor, a pump provided with a motor supply pipe connected with the motor, a pump provided with piston mechanism connected with the motor and adapted to be driven thereby, outlet pipes connected with the motor and driven pump and having discharge openings above the level of the motor, automatic means for increasing the length of the stroke of the driven pump without increasing the speed of the motor, and automatic means for decreasing the length of stroke of the driven pump without decreasing the speed of the motor.

6. In an apparatus of the class described, the combination of a pump, a pump driving motor operatively connected with such pump, automatic means for increasing the length of the stroke of the pump without increasing the speed of the motor, and automatic means for decreasing the length of stroke of the pump without decreasing the speed of the motor.

7. In an apparatus of the class described, the combination of a pump, a pump driving motor operatively connected with such pump, and means for automatically increasing the speed of operation of the pump with relation to the speed of operation of the motor during the operation of the motor at a decreasing speed.

8. In an apparatus of the class described, the combination of a pump, a pump driving motor operatively connected with such pump, and automatic means for decreasing the speed of operation of the pump with relation to the speed of the motor during the operation of the motor at an increasing speed.

9. In an apparatus of the class described, the combination of a pump, a pump driving motor operatively connected with such pump, and means for automatically increasing the speed of operation of the pump with relation to the speed of the motor during the operation of the motor at a decreasing speed, and for decreasing the speed of operation of the pump with relation to the speed of the motor during the operation of the motor at an increasing speed.

10. In an apparatus of the class described, the combination of a pump provided with piston mechanism, an eccentric operatively connected with the piston mechanism, weighted governor mechanism connected with such eccentric, and provided with means for automatically adjusting the eccentric and thereby shortening the length of stroke of the piston mechanism with increasing speed.

11. In an apparatus of the class described, the combination of a receptacle for containing liquid, means for introducing a current of liquid into such receptacle, a motor adapted to be operated by such current of liquid, a pump operatively connected with the motor, and means for increasing the speed of the pump in less degree than the speed of the motor.

12. In an apparatus of the class described, the combination of a receptacle for containing liquid, means for forcing a current of liquid into such receptacle, pump operating mechanism arranged in the path of such current of liquid and adapted to be operated thereby, a pump connected with such pump operating mechanism, and means for increasing the speed of the pump in less degree than the speed of the motor.

13. In an apparatus of the class described, the combination of a pump provided with reciprocating piston mechanism, a pump driving motor operatively connected with such pump, means for automatically increasing the length of stroke of the pump piston during the operation of the motor at a decreasing speed, and means for automatically decreasing the length of stroke of the piston during the operation of the motor at an increasing speed.

14. In an apparatus of the class described, the combination of a pump provided with a piston, an eccentric strap, connecting rod and lever mechanism operatively connecting such eccentric strap with the piston, an inner eccentric, an outer eccentric mounted intermediate the inner eccentric and the eccentric strap, and means for rotating such eccentrics with relation to each other and thereby changing the length of stroke of the pump piston.

MARSHALL MILLER.

Witnesses:
F. J. NEVINS,
R. C. KANN.